April 20, 1926.

G. A. ROMERO 1,581,873

SUGAR CANE HOISTING AND WEIGHING APPARATUS

Filed Sept. 6, 1924     4 Sheets-Sheet 1

INVENTOR.
G. A. Romero
BY
Langner, Parry, Card & Langner
ATTORNEYS.

April 20, 1926.
G. A. ROMERO
1,581,873
SUGAR CANE HOISTING AND WEIGHING APPARATUS
Filed Sept. 6, 1924 4 Sheets-Sheet 2
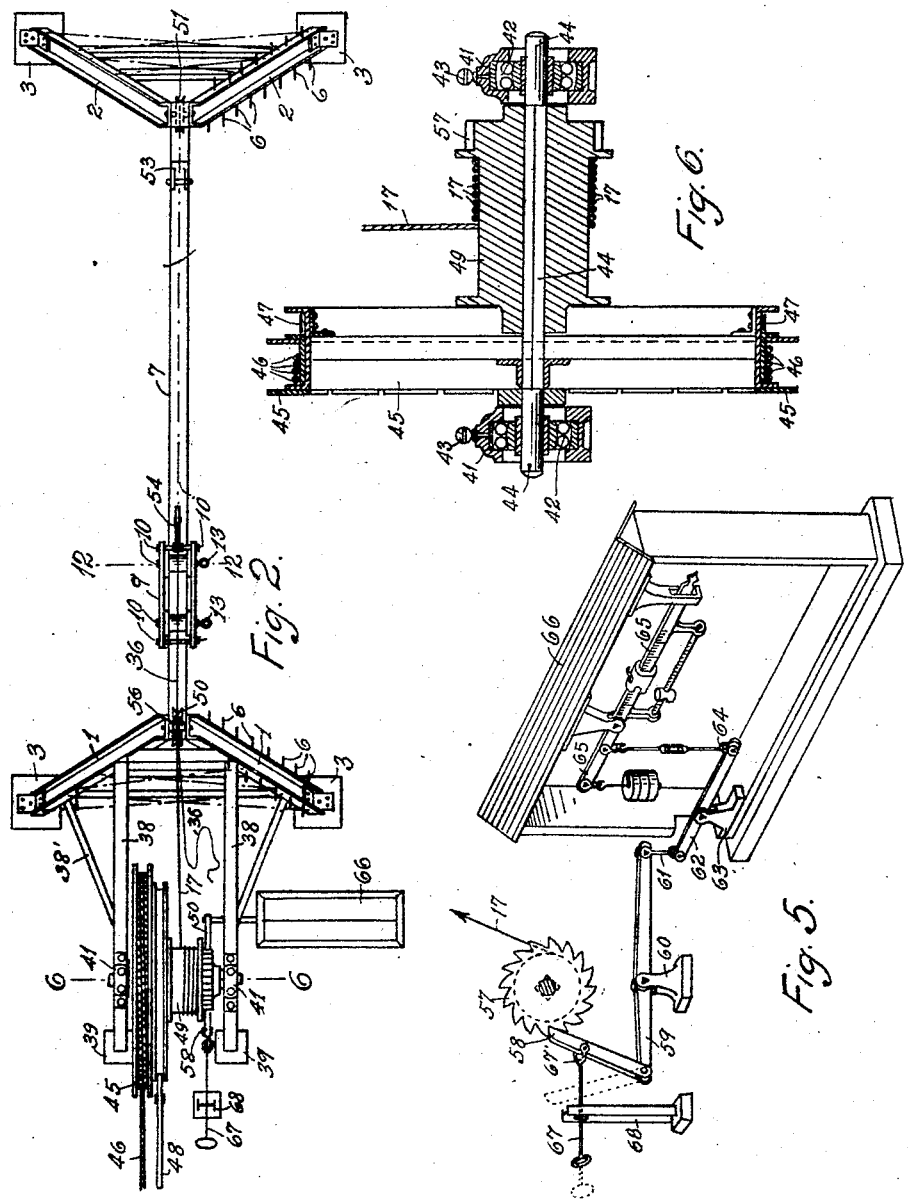
INVENTOR.
G. A. Romero
BY
Langner, Parry, Card + Langner
ATTORNEYS.

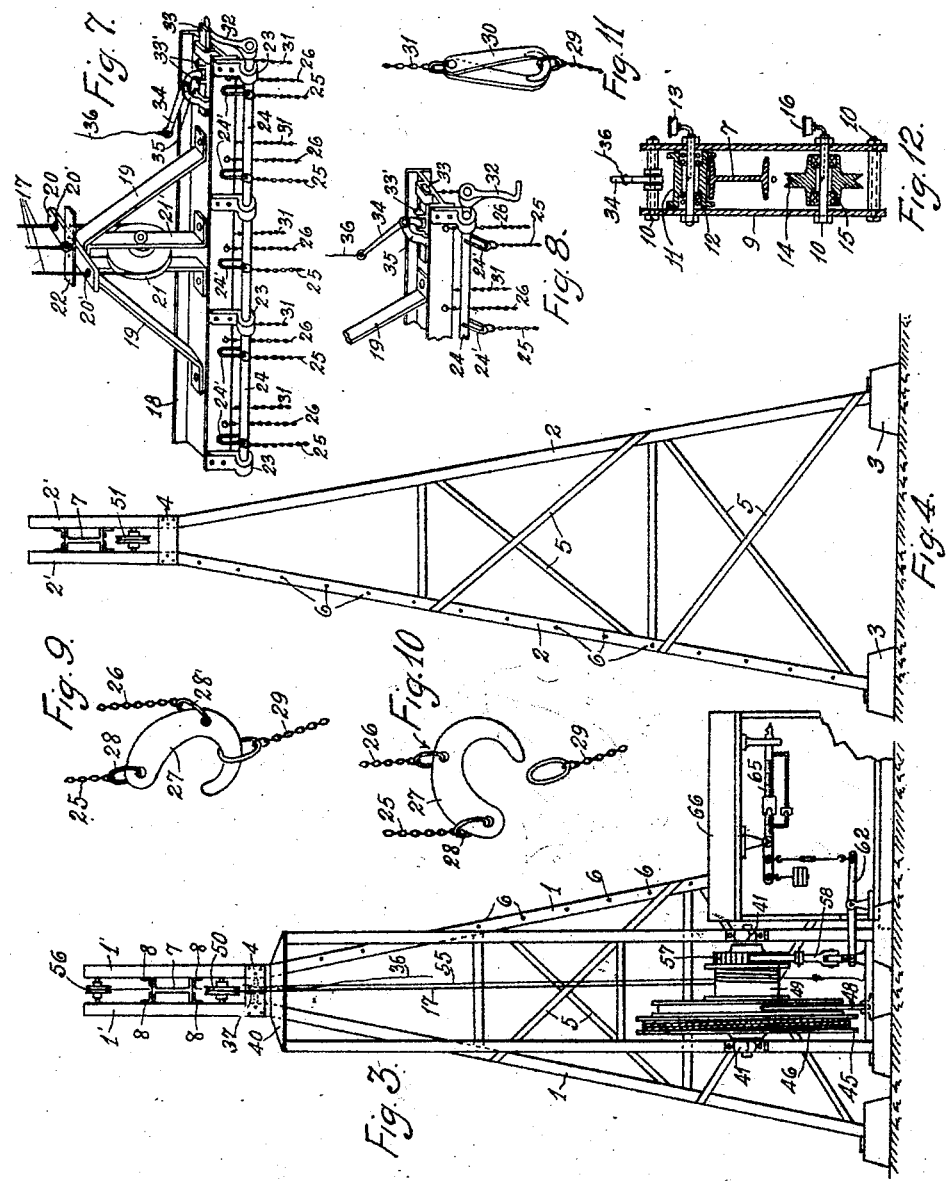

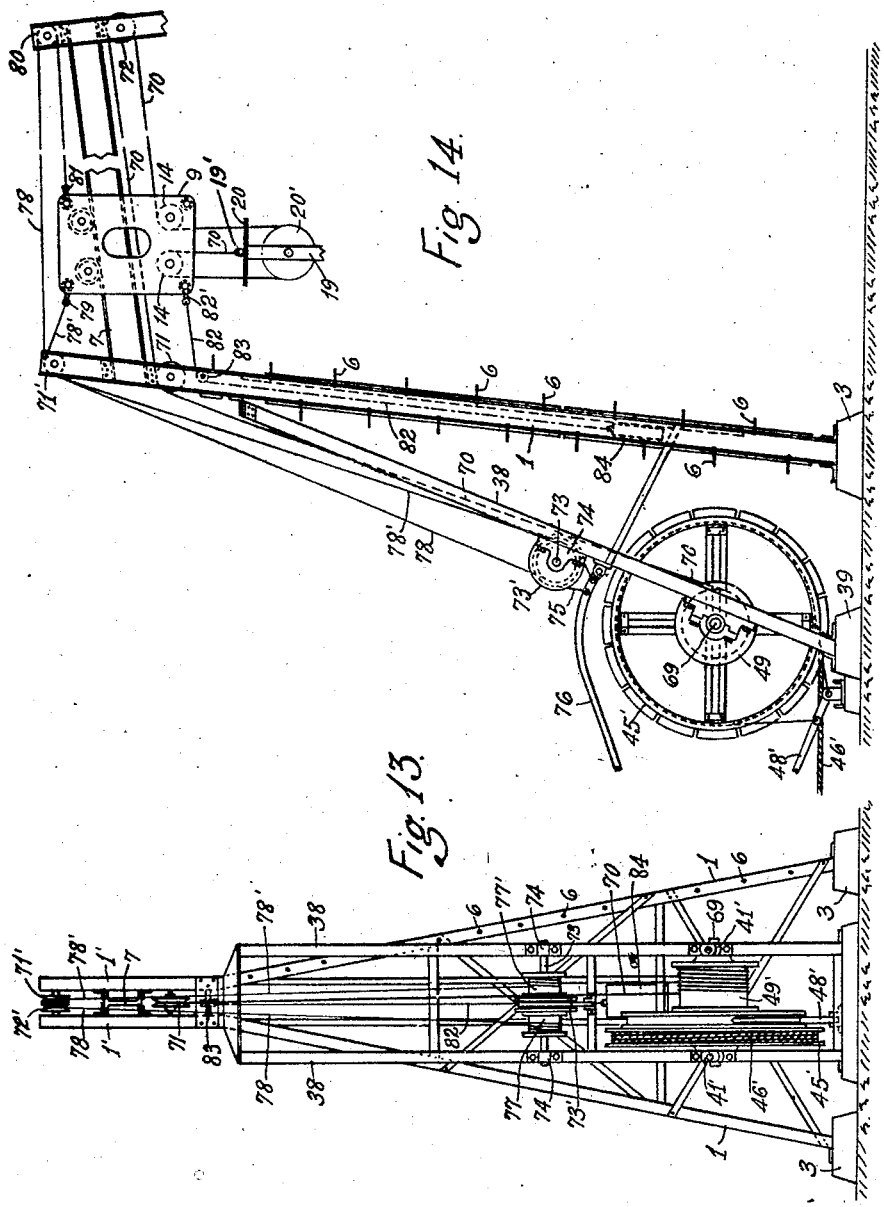

Patented Apr. 20, 1926.

1,581,873

UNITED STATES PATENT OFFICE.

GIL A. ROMERO, OF HABANA, CUBA.

SUGAR-CANE HOISTING AND WEIGHING APPARATUS.

Application filed September 6, 1924. Serial No. 736,379.

*To all whom it may concern:*

Be it known that GIL A. ROMERO, citizen of the Republic of Cuba, residing at Hotel Ritz, Habana, Cuba, has invented certain new and useful Improvements in Sugar-Cane Hoisting and Weighing Apparatus, of which the following is a specification.

This invention refers to sugar-cane hoisting apparatus, taking the cane from the carts which convey same from the fields to the wagon destined to transport it to the mill, and to a mechanism for weighing the cane while it is suspended in the air, in combination with said apparatus.

It is an object of this invention to provide a sugar-cane hoisting apparatus of an extremely simple construction, solid, light, and which may be of metal or wood, and which can be installed at a very low cost, its means of guiding and coiling of ropes, such as pulleys, rollers or drums being provided with an anti-friction and self-lubricating device which causes same to work smoothly and without effort.

Another object of this invention is to provide in combination with a sugar-cane hoisting apparatus, a weighing scale which registers the exact weight of the load of cane, as it is suspended, without the necessity of handling the load of cane with a hooking apparatus in combination with the scale, or, of employing other means which are too complicated and subject to get out of order frequently, as happens in other weighing apparatus of this kind.

More advantages and other consideration pertaining to this invention will be seen in the course of this specification, with the aid of the attached drawings, in which the same characters of reference designate the same parts.

In the drawings—

Figure 2 is an upper plan view of same.

Figure 3 is an end elevation corresponding to the place in which is installed the suspending and hoisting means of the load and the weighing scale.

Figure 4 is an end elevation of the apparatus opposite to that of Figure 3.

Figure 5 is a perspective view in detail, of the weighing scale and its connection with the suspending and load hoisting elements.

Figure 6 is a vertical transversal section in detail on a large scale according to lines 6—6 of Fig. 3.

Figure 7 is a perspective view in detail of the hoisting tackle of the load.

Figure 8 is a perspective view in detail of said tackle showing an operative position of same.

Figures 9, 10 and 11 are perspective views in detail of the hooking elements used for suspending the load.

Figure 12 is a vertical section in detail on an enlarged scale according to lines 12—12 of Fig. 3.

Figure 13 is an end elevation of the hoisting apparatus showing without the weighing device.

Figure 14 is a side elevation of same.

Figure 1:
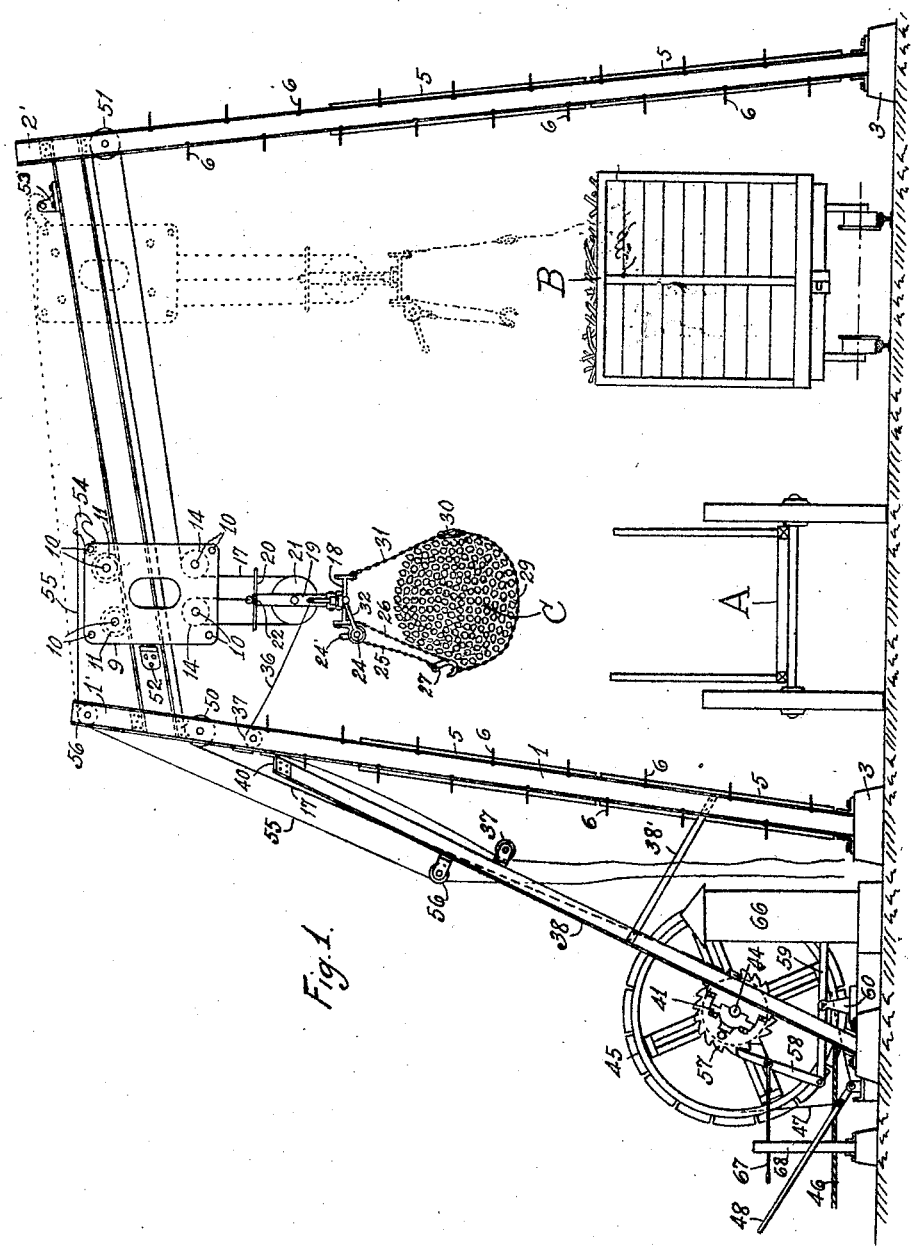
Figure 1 is a side elevation of the apparatus which is the object of this invention.

The apparatus as shown in the drawings consists of a frame formed by two end standards each one constituted by two supports 1 and 2, lowerly seated in concrete bases 3, and inclined convergingly, in its upper ends, which are fastened together by headers 4, and said ends extending upwardly to the headers 4 parallel the one with the other, as is designated numerals 1' and 2'. The posts referred to are reinforced by ties 5 and are provided with steps (6) which gives access to a workman to the upper part of the frame.

The ends 1' and 2' of the posts 1 and 2 support a track or beam 7 holding it inclined in the direction of receiving the load, and which track is secured with regards to said posts, by means of the angular pieces 8.

Along the length of the beam 7 runs a trolley, which as is detailed in Fig. 12 is composed of two plates 9 placed on each side of the beam 7, spaced apart and secured by horizontal bolts 10, two of said bolts serving as an axle to the loose rollers 11, which bear on the upper side of the beam 7, and said rollers being provided with ball-bearings 12 and an oil feeding cup 13. Two of the bolts 10 under the beam 7, serve as axles to the pulley 14 also mounted on ball-bearings 15, and provided with the corresponding oil-feeding cup (16).

Said pulleys serve as guides to the suspension and traction cable 17 of the tackle, which, as is shown in Figures 7 and 8, is connected with a beam of double T section (18) of sufficient web, and placed with its flange horizontal, and having secured on its upper part an angular support 19, on which is fastened horizontally a plate 20 with bores 20' in its ends to permit the passage of the branches of the cable 17 which is guided under a pulley 21 loosely placed on a short horizontal axle, fastened between the two brackets of a standard 21' in —U— shape, which is fastened respectively to the upper part of the support 19 and to the beam 18. A plate 22 fastened transversally and horizontally upon the plate 20 serves as a stop when the hoisting tackle of the load is suspended excessively, said plate becoming engaged on its lower part with the plate 9 of the trolley, and consequently detaining the suspension of the tackle.

On one side of the beam 18, are spaced apart and secured brackets 23, and between same is mounted gyratorially a bar 24 on which are fastened the shaped hooks 24' on which is connected the ends of the chains 25, other corresponding chains 26 are secured to the side of the beam 18 and between both sustain slings in sickle shape, which is shown in detail in Figures 9 and 10, the chains 25 being connected to one end of this hook and on the central part of same the chains 26 ending for said purpose in the rings 28 and 28'.

On the hooks 27 is connected the rings of one end of the strap 29, the opposite ends of which are fastened on hooks, constituted as detailed in Fig. 11, by two hinged fastening pieces, hanging from the chains 31 which are secured to the opposite side of the beam 18.

The gyratorial bar 24 has secured on one of its ends an arm 32 on which it is held in a raised position by a latch 33, operated by a lever 34 pivoted in an arched arm 35, fastened to the beam 18 by its lower forked end, through which passes the latch 33, which has ears 33' on its upper side between which is held one end of the lever 31 on the other end of which is fastened an end of the cable 36 which passes over guide pulleys 37 and hangs within reach of the operator.

Adjacent to the frame of the hoisting apparatus described is placed another frame, comprised of inclosed posts 38 secured lowerly in concrete bases 39 and upperly a union plate 40 riveted to the header 4 corresponding to that end of the frame. The posts 38 are fastened besides with respect to the frame body by ties 38'. Upon the posts 38 are secured the supports 41 provided with ball-bearings 42 and with oil cups 43, on these supports is mounted a horizontal axle 44 in a square section upon which is fastened a bull wheel 45 in one of these channels being round the cable to apply the driving force 46 and in the other is applied a brake 47 handled by a lever 48.

In the same square section of the axle 44, joined to the bull wheel, is a drum 49, on which is wound the suspension and traction cable 17, which is directed upwardly to pass over a guide pulley 50 mounted loosely between the posts 1 under the lower ends of the beam 7, and is directed toward the highest end of same, passing around a guide pulley 51 mounted loosely between the posts 3 and over the pulley 14, then under the pulley 21, and over the other pulley 14, and being finally fastened to an eyebolt 19' secured to the stop plate of the stop 22.

The trolley 9 as it is moved along the beam 7 is detained in the lowest part of same by a stop 52 secured to the sides of said beam, and in the highest part of said beam by a stop 53 which is provided with a horizontal pin to engage a hook 54 pivoted on one of the bolts 10 of the trolley, and which hook has fastened to it a rope 55 which is guided over pulley 56, situated in the posts 1 and 33 until it hangs within the reach of the hand of the operator.

Integral with the drum is a ratchet wheel 57 into which is fitted a pawl in which terminates an arm 58 pivoted to the shorter arm of a weighting lever 59 mounted oscillatory on knife bearings arranged in a support 60. To the longer arm of the lever 59 is connected a suspension 61 which in turn connects with a weighting lever 62 mounted on knife bearings in a support 63, and which lever is connected in its opposite end by a suspension 64 to the weighting beam 65 of a scale placed within a casing 66 which houses also the support 63 and the lever 62 which is carried by same.

The arm 58 is handled by a horizontal rod 67, ending in a fork connected to same and mounted through an opening in a stand 68 secured to the ground.

The operation of this apparatus is as follows:

Supposing a cart "A" containing a bulk of cane "C," and a wagon "B," destined to hoist same, and situated lower than the frame of the hoister, and that the rings of the slings 29 are engaged in the hooks 30, which hang from the chains 31, and in the hooks 27 held by the chains 25 and 26, and the arm 32 of the hoisting tackle sustained by the latch 53 as illustrated in Figure 7 of the drawings.

The pull of the oxen or the driving force which is to be used, is applied to the cable 46, maintaining the brake 47 loose, the load is hoisted upon the turning of the axle 44 and with same the drum 49 on which is coiled the suspension and traction cable 17; while this operation is taking place the pawl 52 is maintained applied to the wheel 57 permitting the continuous escape of same.

Once the load "C" reaches its required height, the pull is checked, and the weight of the load may be taken in the balance 63, due to the fact that the load at that moment acts directly upon the arm of the scale, as the pawl 58 remains connected to the wheel 57 checking the movement in an opposite direction, and sustaining the full weight of the load and exactly transmitting it to the beam 65 by the scale connections shown in Figure 5.

It is evident that the weight of the load can be taken in any place having taken the brake off and checked the pull.

The traction is then continued to be applied to the cable 46 and the trolley 9 ascends to the highest point of the beam 7 until its hook 54 is engaged in the stop 53, then the rod 67 is pulled disconnecting the pawl of the arm 56 from its mesh in the ratchet wheel 57 and the load is lowered controlling its descent by means of the brake 47.

The brake is allowed to remain applied and the rope 36 is pulled which causes the latch 33 to be drawn, which holds the arm 32 and the bar 24 will revolve, as is shown in Figure 8, and discharging the load of cane upon releasing the rings of the slings from the hooks 27 as detailed in Figure 10.

The cable 33 is then pulled to raise the hook 34 and the trolley 9 by its own gravity returns to the starting point, being checked by the stop 32, then the brake 47 is released and the hoisting sling descends until it is located in a convenient position to take the load from the other cart.

In Figures 13 and 14 of the drawing the hoisting apparatus is shown without any of the weighing mechanism.

The frame is the same as that previously described, the parts being designated with the same numerals. The trolley and hoisting tackle also being the same. But several modifications have been made in the means for operating the winding of the suspension and traction cables. For example, in the axle 69 only one winding drum 49' is placed, for the suspension cable 70 of the hoisting tackle 20, and the bull-wheel 45' on which is wound the cable 46' for applying the driving power, and the brake is applied or manipulated by the lever 48'. Upperly and between bearings 74 fastened to the posts 38 of the additional frame, is placed a horizontal axle 73 whereon is fastened a bull-wheel 73' with a plate brake 75 with its lever 76 for winding on drums 77 and 77' the cables 78 and 78' for traction of the trolley and which cables are guided by the pulleys 71 and 72 and 80 and fastened to hooks 79 and 81 of the trolley.

The suspension cable 70 is guided by the pulleys 71 and 72 around the pulleys 14 of the trolley and the pulley 20' of the hoisting tackle.

Finally to the hook 82' of the trolley is fastened the cable 82, which is guided over rollers 83 and from which hangs the counterweight 84.

The operation is practically the same as that previously described and it may be understood, therefore, that the bulk of cane will be hoisted by applying the driving power to the cable 46' and by applying the brake 75 to the wheel 73' and holding lowerly the brake which is operated by the lever 48'.

When the bulk of cane is hoisted to a convenient height the brake 75 is released and then the brake which is operated by lever 48 is engaged and the car runs until it reaches the highest end of the main frame, then the brake 75 is engaged and the brake which is operated by the lever 48 is released, the descent of the tackle is therefore controlled in this manner, then the unloading of the bulk is operated in the manner described above, and by the action of the counter-weight the car returning to its former position the brake 75 being released.

It is evident that in the construction described many changes may be made, not only regarding the main frame of the hoister, the construction of which to my understanding is original in my invention, on account of its lightness, soundness and plainness, but also with regards to the means for suspending and hoisting the load, especially if instead of animal traction a motor is used, as in this case the brake 47 may be eliminated.

The connection of the balance with the hoisting apparatus may also be modified, by using another mechanism, which enters nevertheless within the scope of the substantial idea of my invention, so that I do not limit myself to the above description but desire that the patent certificates protect the consignment within the scope of the following.

Claims—

1. Means for weighing a cable suspended load, comprising, a coiling drum for the cable suspending a load, to be weighed, a scales, and a releasable operable connection between the drum and the scales.

2. Means for weighing a cable suspended load, comprising, a coiling drum for the cable suspending a load, to be weighed, a scales, and a releasable operable connection between the drum and the scales, the connection including, a ratchet wheel on the drum, a pawl arm cooperating with the ratchet wheel, a knife-pivoted lever, a connection between the pawl arm and the lever, a connection between the lever and the beam of the scale, and a release arm connected to the pawl arm for applying a load to, and releasing it from, the scales.

3. Means for weighing a cable suspended load, comprising, a coiling drum for the cable suspending a load, to be weighed, a scales, and a releasable operable connection between the drum and the scales, the connection including, a ratchet wheel on the drum, a pivoted pawl arm cooperating with the ratchet wheel, a first horizontal knife-pivoted lever having a long and a short arm, a connection between the long arm of the pawl arm and the short arm of the lever, a second pivoted lever having a long and a short arm, a connection between the long arm of the first lever and the short arm of the second lever, and a connection between the long arm of the second lever and the beam of the scales, and a pivoted release arm connected to the pawl arm for applying the load to, and releasing it from, the scales.

GIL A. ROMERO.